3,341,306
PREPARATION OF DIFLUOROAMINE

Donald H. Kelly, Gladstone, and Bernard Sukornick, Elizabeth, N.J., assignors to Allied Chemical Corporation, New York, N.Y., a corporation of New York
No Drawing. Filed July 18, 1963, Ser. No. 296,886
8 Claims. (Cl. 23—356)

This invention relates to processes for making difluoramine $HNF_2$, a known compound normally a colorless gas having a boiling point of about minus 23° C. Difluoramine is useful as a reactant, e.g. with boron trichloride or carbonyl chloride to form chlorodifluoramine. $F_2NCl$, which in turn is useful as a chemical intermediate such as for reaction of mercury by known methods to make tetrafluorohydrazine, $N_2F_4$, a commercially available material.

It has been found that sulfamic acid, water, and elemental fluorine may be reacted conveniently under certain economic and easily controllable reaction conditions to form difluoramine with notably high yields. Overall reaction is thought to be represented by $$NH_2SO_3H + H_2O + 2F_2 \rightarrow H_2SO_4 + 2HF + HNF_2$$

Practice of the invention processes in general comprises forming an aqueous solution of sulfamic acid, subjecting the sulfamic acid while in aqueous solution to the action of certain quantities of elemental fluorine at certain reaction temperatures, and recovering difluoramine from the reaction mass.

Major factors involved in reaction control are proportioning of starting material reactants, i.e. sulfamic acid, water and fluorine; and the temperatures utilized to effect the $HNF_2$ forming reaction.

Stoichiometric ratios of incoming reactants charged to the process are substantially as above indicated. However, for convenient practice, water is utilized in relatively large excess. Minimum desirable amount of water is that needed to make, with the particular quantity of sulfamic acid charged, a liquor which may be readily agitated. While proportions of sulfamic acid and water may be such that the aqueous liquor is not saturated with sulfamic acid, no advantage is afforded by use of water greater than the amount needed at the outset of a run to form a water solution substantially saturated with sulfamic acid, and such solution is preferred.

Procedurally, in usual practice a solution, preferably consisting of the particular amount of sulfamic acid to be processed and water in amount to form a water solution saturated with sulfamic acid, is introduced into a suitable reactor, made of e.g. Monel, Teflon, and Pyrex, and having an inlet for gaseous fluorine, an off-gas outlet, and suitable accessories arranged to provide for maintenance of the reactor and contents at herein indicated temperatures. A product recovery system may include a drying tower for removal of moisture from the reactor off-gas, and a cold trap equipped with refrigerating facilities which may be regulated to condense difluoramine and recover the same as liquid in the cold trap. In general, apparatus suitable for practice of a preferred embodiment of the invention may be of the type indicated in appended Example 1.

The quantity of fluorine fed into the reactor for reaction with sulfamic acid and water may be in any proportion which effects substantial reaction with sulfamic acid and water to form substantial amounts of difluoramine. As little as 1.0–1.5 mols of fluorine per mol of sulfamic acid charged may be used. In order to avoid formation of appreciable amounts of nitrogen trifluoride as byproduct, not more than about 2.5 mols of fluorine should be employed, and to minimize $NF_3$ formation and enhance yields it is preferred to charge not more than about 2 mols of fluorine per mole of sulfamic acid. Usually mol proportions of sulfamic acid and fluorine are just short of or about two mols of fluorine per mol of sulfamic acid. Also, to further reduce likelihood of $NF_3$ formation, fluorine as fed should be diluted with at least four volumes of inert gas such as nitrogen and helium, preferably with not less than five volumes, and generally in the range of 5–15 volumes per volume of fluorine. On introduction of gaseous fluorine into the reactor, although reaction is rapid it is preferred to introduce fluorine at a rate such that fluorine is substantially consumed as fed, a condition readily determinable by the absence of fluorine in the recovery system off-gas.

Reaction temperature is a major procedural control factor for successful practice. Depending upon the particular process embodiment to be carried out, reaction temperature may vary from a little below 0° C. up to about 30° C. The expression "reaction temperature" is intended to indicate temperature during the period in which elemental fluorine is being charged into the reactor.

In accordance with the invention it has been found that when a previously described charge of an aqueous solution of sulfamic acid is subjected to the action of elemental fluorine at a representative reaction temperature of about 20° C., sulfamic acid, water and fluorine react almost instantaneously to form difluoramine which is simultaneously discharged from the reaction mass as an off-gas, "simultaneous" being used in the sense to indicate evolution of $HNF_2$ from the reaction mass concurrent with introduction of gaseous fluorine. This discovery provides for operation of the reaction at substantially room temperature, thus affording a self-evident operating advantage. Foregoing feed of gaseous fluorine and simultaneous discharge of $HNF_2$ gas from the reaction mass may be accomplished at temperatures which may lie substantially in the range of 10–30° C. At temperatures in the lower part of this range, e.g. of the order of 10–15° C., evolution of $HNF_2$ from the reaction mass may be significant but relatively slow and economically undesirable. Hence, when circumstances are such as to make desirable substantial simultaneous feed of fluorine and evolution of $HNF_2$, a minimum reaction temperature of about 15° C. is preferred. More desirable reaction temperatures lie in the range of about 15–30° C., and ordinarily at just about room temperature, which reaction temperature along with other preferred procedural factors constitute most practicable and most preferred embodiments. Reaction temperatures above about 30° C. afford no advantages and desirably should be avoided to minimize formation of $NF_3$.

End point of reaction may be readily determined by cessation of further accumulation of liquid $HNF_2$ in the cold trap, or by appearance of fluorine in the recovery system tail gas. If desired, after fluorine flow has been terminated, temperatures may be raised to about 80–85° C. to facilitate clean-out from the reaction mass of any occluded $HNF_2$. Reactor residue comprises an aqueous solution of $H_2SO_4$ and HF.

In the foregoing embodiment, the following reactions may be involved:

(a) $$NH_2SO_3H + 2F_2 \rightarrow NF_2SO_3H + 2HF$$

and (b) $$NF_2SO_3H + H_2O \rightarrow H_2SO_4 + HNF_2$$

If such reactions are involved, practice indicates that at the temperatures above described, such reactions take place substantially instantaneously and not perceptibly stepwise.

Recovery of sought-for $HNF_2$ product from the reactor exit gas may be substantially conventional. The reactor exit gas may be passed thru a suitable drying tower to remove water and any possible $H_2SO_4$ mist. The dried gas stream may then be passed thru a cold trap refrigerated to say minus 80° C. by Dry Ice to condense out and collect $HNF_2$ as a colorless liquid. As demonstrated in the appended examples, the off-gas of the cold trap may contain nitrogen or other inert gas diluent and trace amounts of $N_2O$, $SiF_4$, $NF_3$ and $CF_4$, but no difluoramine. On completion of a run, $HNF_2$ may be recovered from the cold trap by conventional distillation, experience showing that the difluoramine thus obtained is substantially pure.

In accordance with another embodiment, it has been found that difluoramine may be made by what may be considered as a two-stage procedure. In this modification, proportioning of starting material reactants is the same as previously described. We find that when a reactor charge, preferably consisting of a water solution saturated with sulfamic acid, is subjected to the action of elemental fluorine at temperatures substantially in the range of 0° C. or a little below to about plus 10° C. there is formed in the reaction mass an intermediate which is non-volatile at fluorination temperatures substantially in the range of 0–10° C. It has been found that at these fluorination temperatures while the off-gas of the recovery system, i.e. the off-gas of the cold trap, contains nitrogen or other inert gas diluent, and trace amounts of $N_2O$, $SiF_4$, $NF_3$ and $CF_4$, nothing is collected in the cold trap, thus demonstrating that no $HNF_2$ is evolved in the reaction mass during low temperature fluorination. In practice of this embodiment, it is preferred to maintain temperatures of the reactor and contents substantially in the range of 0° C. to plus 5° C. At these temperatures, readily maintained by immersion of the reactor in an ice bath, fluorination is rapid, and formation of the foregoing noted trace amount of impurities is minimized.

Further, it is found that on termination of fluorination, i.e. cessation of fluorine feed, when temperature of the mass in the reactor is raised above about 10° C., preferably above 15° C., and more usually to about room temperature or 20–30° C., gaseous $HNF_2$ is rapidly evolved from the mass in the reactor. If desired, in order to hasten evolution of $HNF_2$ in the reactor, the latter and contents thereof may be heated to temperatures above room temperature but not to temperatures appreciably above 80–85° C. Higher temperatures afford no advantage and tend to increase water and $H_2SO_4$ mist carry-off from the reactor along with $HNF_2$ gas. In this modification, recovery of $HNF_2$ discharged from the reactor may be the same as above described.

It is thought that in practice of this two-stage embodiment, reactions may proceed more or less stepwise in accordance with above equations (a) and (b), the non-volatile intermediate formed during the low temperature fluorination stage probably being N,N-difluorosulfamic acid which during the succeeding higher temperature stage reacts rapidly with water to effect evolution of the $HNF_2$ gas.

The following illustrate practice of the invention.

Example 1.—About 5 g. (0.05 mol) of sulfamic acid were dissolved in about 45 ml. of water at room temperature in a 3-necked glass flask fitted with a gas inlet, an agitator, and a gas outlet connected in series thru an ice trap, a Dry Ice condenser equipped with a calibrated glass trap, and an infrared cell. Preliminarily, the system was flushed for about an hour by introduction of nitrogen charged at a rate of about 200 cc. per minute. After flushing, and while the solution was being agitated, for a period of about 2½ hours, during which time the reactor and contents remained at about room temperature, a mixture consisting of nitrogen and elemental fluorine was fed into the reactor at a rate of about 200 cc. of nitrogen and about 15 cc. of fluorine per minute. Rate of introduction of the mixture into the agitated solution was such that fluorine was consumed substantially as fed. Off-gases of the reactor were passed successively thru the ice trap to condense out water, thru the Dry Ice trap to condense out and collect difluoramine, and then thru the infrared cell. In the 2½ hour period, about 0.1 mol. of fluorine was fed, and mol ratio of total reactants charged was about 2 mols of fluorine per mol of $NH_2SO_3H$. During fluorination, off-gases of the Dry Ice trap contained nitrogen, and as shown by infrared analysis, traces of $N_2O$, $SiF_4$, $NF_3$ and $CF_4$, but no $HNF_2$. At the end of the run, during which $HNF_2$ was continuously evolved at the approximate room temperature of reaction, about 1.4 ml. of water-white liquid had been condensed and collected in the minus 80° C. trap. The latter was removed from the Dry Ice bath and allowed to warm up. The liquid in the trap was evaporated into a nitrogen stream to carry the same into infrared analysis equipment. Aside from nitrogen, infrared analysis showed that the off-gas from the warmed up trap contained only difluoramine, $HNF_2$. Also mass spectral analysis of the trap contents showed the same to be substantially pure $HNF_2$. On the basis of the amount of liquid collected in the minus 80° C. trap and the amount of sulfamic acid charged, yield of difluoramine was about 77% of theory.

Example 2.—In this run, a mixture consisting of nitrogen and elemental fluorine was introduced into the reactor at a rate of about 200 cc. of nitrogen and about 30 cc. of fluorine per minute. In about a 1½ hr. period, the duration of the run, about 0.12 mol of fluorine was fed, and mol ratio of total reactants charged was about 2.4 mols of fluorine per mol of $NF_2SO_3H$. At the end of the run, about one ml. of liquid had been condensed and collected in the minus 80° C. trap. Otherwise the run was substantially the same as detailed in Example 1. In the present example, on the basis of the amount of liquid collected in the minus 80° C. trap and the amount of sulfamic acid charged, yield of difluoramine was about 55.5% of theory.

Example 3.—About 5 g. (0.05 mol) of sulfamic acid were dissolved in about 45 ml. of water in the reactor of Example 1, and the reactor and contents cooled to about zero to plus 5° C. Preliminarily, the solution in the reactor, while agitated, was flushed for about half an hour by introduction of nitrogen charged at a rate of about 200 cc. per minute. After flushing, and while the solution in the reactor was being agitated, for a period of about one hour, during which time the reactor and contents were maintained at temperature of about 0–5° C., a mixture consisting of nitrogen and elemental fluorine was introduced to the reactor at a rate of about 200 cc. of nitrogen and about 40 cc. of fluorine per minute. Rate of introduction of the mixture into the agitated solution was such that fluorine was consumed substantially as fed. About 0.1 mol of fluorine was fed, and mol ratio of total reactants charged was about 2 mols of fluorine per mol of $NH_2SO_3H$. During charging of fluorine, infrared analysis of the off-gas of the reactor showed that the off-gas contained trace amounts of $N_2O$, $NF_3$, $SiF_4$ and $CF_4$, but no $HNF_2$. After feed of fluorine was stopped, the reactor was flushed with nitrogen for about 30 minutes while the reactor and contents were maintained at the approximate 0–5° C. temperature. Then the gas outlet of the reactor was connected in series thru a tower containing Drierite, a Dry Ice condenser equipped with a calibrated glass trap, and an infrared cell. The ice bath was removed from around the reactor, and the reactor and contents allowed to warm up to room temperature for a period of about an hour and a half, off-gases of the reactor being passed thru the drying tower and the Dry Ice trap. Particularly when the reactor and contents were above about 10° C. and approaching room temperature, $HNF_2$ began to collect in the trap. For a period of about two hours a slow stream of nitrogen was passed thru the reactor to facilitate sweeping out of $HNF_2$ thru the drying tower and into the trap. During the warming up and nitrogen sweep periods, off-gases of the Dry Ice trap contained only nitrogen, and infrared analysis showed no $HNF_2$. At the end of the run, i.e. termination of nitrogen sweep out of the reactor, about 1.4 ml. of water-white liquid had been condensed and collected in the minus 80° C. trap. The latter was removed from the Dry Ice bath and allowed to warm up. The liquid in the trap was evaporated into a nitrogen stream to carry the same into infrared analysis equipment. Aside from nitrogen, infrared analysis showed that the off-gas from the warmed up trap contained only difluoramine, $HNF_2$. On the basis of the amount of liquid collected in the minus 80° C. trap and the amount of sulfamic acid charged, yield of difluoramine was about 77% of theory.

We claim:

1. The process for making difluoramine which comprises subjecting sulfamic acid in aqueous solution to the action of gaseous elemental fluorine, in amount not substantially in excess of 2.5 mol proportions of fluorine per mol of $NH_2SO_3H$, while maintaining reaction temperature substantially in the range of 0–30° C. and recovering gaseous difluoramine which is evolved from the resulting reaction mass at a temperature substantially in the range of about 10–85° C.

2. The process of claim 1 in which fluorine is charged in amount not substantially in excess of 2 mol proportions per mol of $NH_2SO_3H$.

3. The process for making difluoramine which comprises subjecting sulfamic acid in aqueous solution to the action of gaseous elemental fluorine, in amount not substantially in excess of 2.5 mol proportions of fluorine per mol of $NH_2SO_3H$, at temperature substantially in the range of 0–30° C., and effecting evolution of gaseous difluoramine from the reaction mass while maintaining the same at temperature substantially in the range of 15–30° C., and recovering evolved difluoramine.

4. The process of claim 3 in which fluorine is charged in amount not substantially in excess of 2 mol proportions per mol of $NH_2SO_3H$.

5. The process of claim 3 in which fluorine is charged as an inert gas-fluorine mixture containing not less than 4 volumes of inert gas per volume of fluorine, and rate of charging of the mixture is slow enough so that fluorine is substantially completely consumed as charged.

6. The process for making difluoramine which comprises subjecting sulfamic acid in aqueous solution to the action of gaseous elemental fluorine in amount not substantially in excess of 2.5 mols of fluorine per mol of $NH_2SO_3H$, while maintaining reaction temperature substantially in the range of 0–5° C., and thereafter heating the reaction mass to higher temperature but not substantially above 85° C., and recovering difluoramine resultingly evolved from the reaction mass.

7. The process of claim 6 in which reaction temperature is substantially in the range of 0–5° C., and subsequent heating of the reaction mass is such as to bring temperature thereof substantially in the range of 15–30° C.

8. The process for making difluoramine which comprises subjecting sulfamic acid in aqueous solution to the action of gaseous elemental fluorine, in amount not substantially in excess of two mols of fluorine per mol of $NH_2SO_3H$, while maintaining reaction temperature substantially in the range of 15–30° C., and recovering difluoramine resultingly evolved from the reaction mass.

References Cited

Cupery et al., "Industrial and Engineering Chemistry," vol. 34, pages 792–796 (1942).

Graukaushas, "American Chemical Society, Abstracts of Papers, 140th Meeting, 1961," pages 23M, 24M.

MILTON WEISSMAN, *Primary Examiner.*

CARL D. QUARFORTH, *Examiner.*